(12) United States Patent
Stanton et al.

(10) Patent No.: US 11,640,490 B2
(45) Date of Patent: May 2, 2023

(54) SOURCE MASK OPTIMIZATION BY PROCESS DEFECTS PREDICTION

(71) Applicant: Synopsys, Inc., Mountain View, CA (US)

(72) Inventors: William Stanton, Mountain View, CA (US); Sylvain Berthiaume, Mountain View, CA (US); Hans-Jurgen Stock, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/184,521

(22) Filed: Feb. 24, 2021

(65) Prior Publication Data

US 2021/0264091 A1    Aug. 26, 2021

Related U.S. Application Data

(60) Provisional application No. 62/981,452, filed on Feb. 25, 2020.

(51) Int. Cl.
*G06F 30/398* (2020.01)
*G06F 111/20* (2020.01)
*G06F 119/18* (2020.01)

(52) U.S. Cl.
CPC ........ *G06F 30/398* (2020.01); *G06F 2111/20* (2020.01); *G06F 2119/18* (2020.01)

(58) Field of Classification Search
CPC .................................................. G06F 30/398
USPC ......................................................... 716/53
See application file for complete search history.

(56) References Cited

U.S. PATENT DOCUMENTS

| | | |
|---|---|---|
| 7,378,202 B2 | 5/2008 | Granik et al. |
| 8,849,008 B2 | 9/2014 | Zhou et al. |
| 9,934,346 B2 | 4/2018 | Hansen |
| 10,599,046 B2 | 3/2020 | Kim |
| 11,061,373 B1 | 7/2021 | Khaira et al. |
| 11,079,687 B2 | 8/2021 | Slachter et al. |
| 11,468,222 B2 | 10/2022 | Kandel et al. |

(Continued)

FOREIGN PATENT DOCUMENTS

WO    WO-2021062040 A1    4/2021

OTHER PUBLICATIONS

U.S. Notice of Allowance dated Jun. 29, 2022 in U.S. Appl. No. 17/183,291.

(Continued)

*Primary Examiner* — Eric D Lee
(74) *Attorney, Agent, or Firm* — Weaver Austin Villeneuve & Sampson LLP

(57) ABSTRACT

A method of generating a mask used in fabrication of a semiconductor device includes, in part, selecting a source candidate, generating a process simulation model that includes a defect rate in response to the selected source candidate, performing a first optical proximity correction (OPC) on the data associated with the mask in response to the process simulation model, assessing one or more lithographic evaluation metrics in response to the OPC mask data, computing a cost in response to the assessed one or more lithographic evaluation metrics, and determining whether the computed cost satisfies a threshold condition. In response to the determination that the computed cost does not satisfy the threshold condition, a different source candidate may be selected.

20 Claims, 6 Drawing Sheets

(56) References Cited

U.S. PATENT DOCUMENTS

| | | | |
|---|---|---|---|
| 11,475,201 | B2 | 10/2022 | Stanton et al. |
| 2021/0018850 | A1* | 1/2021 | Slachter .................. G03F 7/705 |
| 2021/0263404 | A1 | 8/2021 | Kandel et al. |
| 2021/0263405 | A1 | 8/2021 | Stanton et al. |
| 2021/0263407 | A1 | 8/2021 | Levinson et al. |

OTHER PUBLICATIONS

Biafore et al., J. J., "Statistical simulation of resist at EUV and ArF," Proc. SPIE 7273, Advances in Resist Materials and Processing Technology XXVI, SPIE Advanced Lithograph, Apr. 1, 2009, San Jose, CA, 11 pp.

De Bisschop et al., P., "Stochastic Printing Failures in EUV Lithography," Proc. SPIE 10957, Extreme Ultraviolet (EUV) Lithography X, SPIE Advanced Lithography, Mar. 26, 2019, San Jose, CA, 21 pp.

Ex Parte Quayle Action dated Mar. 28, 2022 issued in U.S. Appl. No. 17/182,135.

Jonckheere, R., et al., "Stochastic printing behavior of ML-defects on EUV mask," Proc. SPIE 11147, Int'l Conference on Extreme Ultraviolet Lithography, Oct. 24, 2019, SPIE Photomask Technology + EUV Lithography, Monterey, CA, 14 pp.

Kim et al., S.-M., "Understanding of stochastic noise," Proc. SPIE 9422, Extreme Ultraviolet (EUV) Lithography VI, SPIE Advanced Lithography, Apr. 7, 2015, San Jose, CA, 12 pp.

Lucas, K., et al., "Exploration of compact and rigorous simulation-based methods to reduce stochastic failure risk," EUV Workshop, 2019 Synopsys, Inc., 23 pp.

Maslow, M. J., et al., "Impact of Local Variability on Defect-Aware Process Windows," Proc. SPIE 10957, Extreme Ultraviolet (EUV) Lithography X, SPIE Advanced Lithography, Mar. 26, 2019, San Jose, CA, 16 pp.

P. De Bisschop, "Stochastic effects in EUV lithography: random, local CD variability, and printing failures," J. Micro/Nanolithography, MEMS, MOEMS, vol. 16, No. 4, p. 041013-1-041013-17, Oct.-Dec. 2017.

U.S. Notice of Allowance dated Jun. 9, 2022 in U.S. Appl. No. 17/182,135.

U.S. Notice of Allowance dated Mar. 16, 2022 issued in U.S. Appl. No. 17/183,291.

U.S. Office Action dated Sep. 28, 2021 issued in U.S. Appl. No. 17/183,291.

Wintz et al., D. T., "Photon flux requirements for extreme ultraviolet reticle imaging in the 22-and 16-nm nodes," J. Micro/Nanolith. MEMS MOEMS vol. 9, No. 4, Oct.-Dec. 2010, 8 pp.

U.S. Supplementary Notice of Allowance dated Sep. 14, 2022 in U.S. Appl. No. 17/182,135.

U.S. Supplementary Notice of Allowance dated Sep. 14, 2022 in U.S. Appl. No. 17/183,291.

* cited by examiner

SOURCE MASK OPTIMIZATION BY PROCESS DEFECTS PREDICTION

RELATED APPLICATION

The present application claims benefit under 35 USC 119(e) of U.S. Application Ser. No. 62/981,452 filed Feb. 25, 2020, the content of which is incorporated herein by reference in its entirety.

TECHNICAL FIELD

The present disclosure relates to masks and optical sources used during the fabrication of semiconductor devices, and more particularly to applying stochastic defect models in optimizing such masks and optical sources.

BACKGROUND

Extreme Ultraviolet (EUV) Lithography is the primary patterning method for fabricating 20 nm and smaller dimensions during the manufacture of semiconductor devices. Source Mask Optimization (SMO) accounts for hardware tools from deep ultraviolet (DUV) to EUV scanners, and for process characteristics (mask and wafer processing) so as to generate an optimum source illumination and mask. Applying simulation tools in the SMO flows has become a common practice to enhance lithography resolution, provide robust imaging of smaller features, and improve yield.

BRIEF SUMMARY

A method of generating a mask used in fabrication of a semiconductor device includes, in part, selecting a source candidate, generating a process simulation model that includes a defect rate in response to the selected source candidate, performing a first optical proximity correction (OPC) on the data associated with the mask in response to the process simulation model, assessing one or more lithographic evaluation metrics in response to the OPC mask data, computing a cost in response to the assessed one or more lithographic evaluation metrics, and determining, by a processor, whether the computed cost satisfies a threshold condition. In response to the determination that the computed cost does not satisfy the threshold condition, a different source candidate is selected.

A non-transitory computer readable storage medium includes instructions which when executed by a processor cause the processor to select a source candidate, generate a process simulation model that includes a defect rate in response to the selected source candidate, perform a first optical proximity correction (OPC) on the data associated with the mask in response to the process simulation model, assess one or more lithographic evaluation metrics in response to the OPC mask data, compute a cost in response to the assessed one or more lithographic evaluation metrics, and determine whether the computed cost satisfies a threshold condition, and in response to the determination that the computed cost does not satisfy the threshold condition, select a second source candidate.

A system includes, in part, a memory configured to store instructions; and a processor, coupled with the memory and configured to execute the instructions. The instructions when executed causing the processor to select a source candidate, generate a process simulation model that includes a defect rate in response to the selected source candidate, perform a first optical proximity correction (OPC) on data associated with the mask in response to the process simulation model, assess one or more lithographic evaluation metrics in response to the OPC mask data, compute a cost in response to the assessed one or more lithographic evaluation metrics, determine whether the computed cost satisfies a threshold condition; and in response to the determination that the computed cost does not satisfy the threshold condition, select a second source candidate.

BRIEF DESCRIPTION OF DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
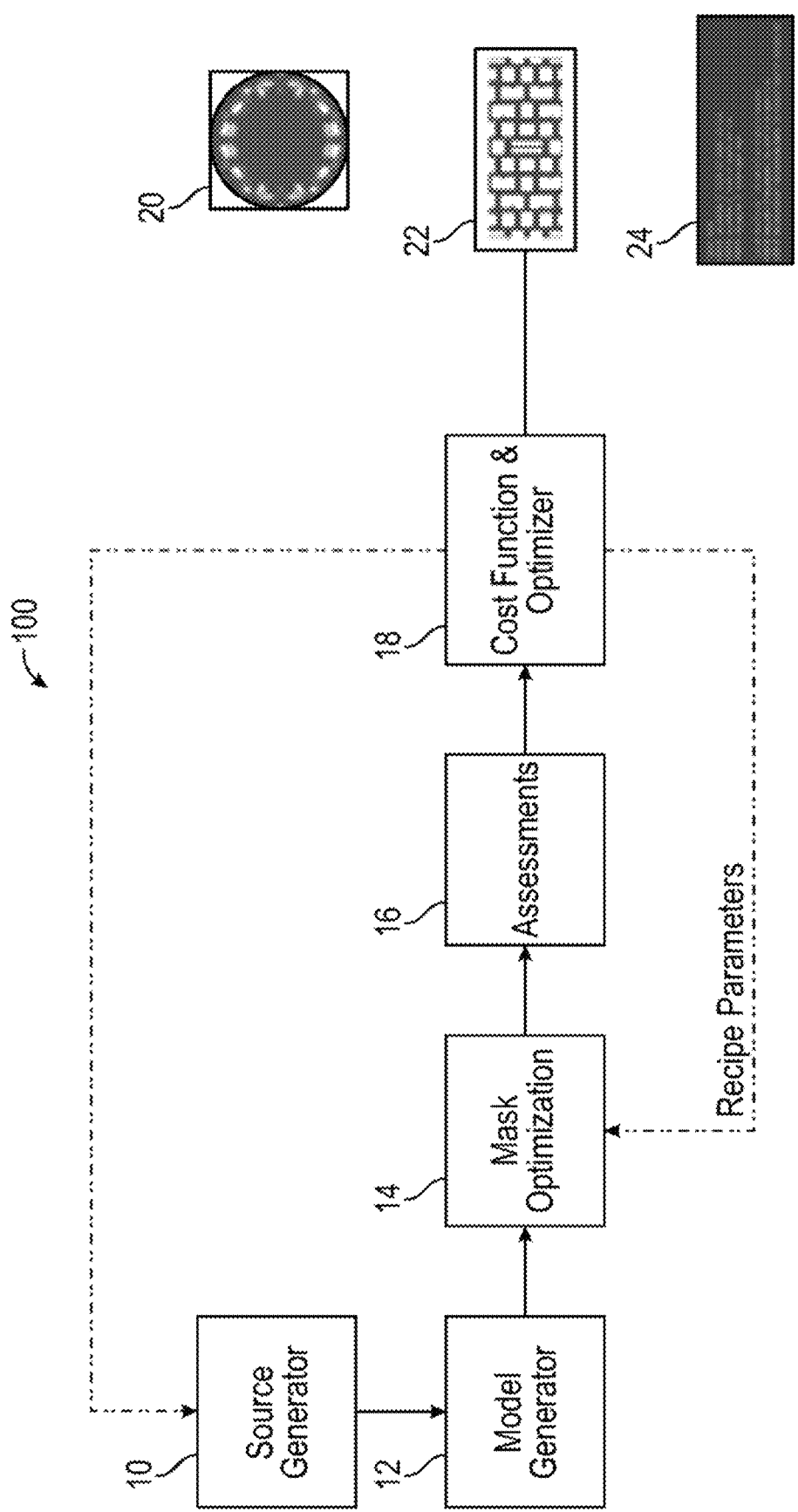
FIG. 1 shows a source mask optimization flow 100 adapted to account for defectivity, in accordance with one embodiment of the present disclosure.

Extreme ultraviolet (EUV) lithography is a primary processing step used to fabricate semiconductor features in high volume manufacturing. An EUV mask may include, for example, forty alternating layers of silicon and molybdenum to reflect the EUV light through Bragg diffraction. The Bragg reflectance is a relatively strong function of incident angle and the wavelength of the light. Relatively longer wavelengths reflect the light more near normal incidence and relatively shorter wavelengths reflect the light away from normal incidence.

An EUV lithography pattern may be defined in a tantalum-based absorbing layer over the multilayer mask. An EUV mask absorber, due to partial transmission, generates a phase difference between the $0^{th}$ and $1^{st}$ diffraction orders of a line-space pattern, resulting in image shifts at a given illumination angle due to depth of focus, which in turn results in different positions of best focus for different pitches and different illumination angles.

An aspect of an EUV lithography tool, resulting from the use of reflective optics, is the off-axis illumination (typically set at an angle of about 6 degrees) in different direction at different positions within the illumination slit on a multi-layer mask. The off-axis illumination may lead to shadowing effects, thereby causing asymmetry in the diffraction pattern and causing the pattern fidelity to degrade. The combination of the off-axis asymmetry and the mask shadowing effect may lead to an inability to focus concurrently even on identical mask features that are in close proximity of one another. Mask features positioned at different locations may also shift differently due to different local deviations from mask flatness and defects buried under the multilayer mask.

Source Mask Optimization (SMO) is often used in order to enable high resolution and robust imaging of relatively small mask features so as to improve yield. An SMO flow accounts for hardware (such as EUV scanner), and process characteristics (such as mask, photoresists, and wafer processing) in order to optimize the source illumination and mask, thereby to improve wafer yield.

Conventional SMO flows focus on the Normalized Image Log Slope (NILS) during the optimization to account for EUV defectivity. Conventional SMO flows, however, do not factor in stochastic processes occurring in, for example, EUV scanners, wafers, masks, photon shot noise present in the path of the photon to a wafer, secondary electron paths, quencher, inhibitor initial distribution, as well as random kinetic paths taken during the photoresist bake and development processes. Conventional SMO flows are therefore insufficient in overcoming the challenges posed by advanced lithography processes.

An EUV lithography tool is sensitive to stochastic effect. In a relatively large population of features printed by an EUV tool, some features fail to print thus causing defects such as missing holes or bridging lines. A known factor contributing to such failures is the dose used in the EUV tool. The dose is related to photon shot noise. Due to the stochastic variations in the number of photon impinging on the mask, some mask areas designated to otherwise print fail to reach a threshold needed to do so. Other mask areas may be overexposed, thus leading to excessive resist loss or crosslinking. The probability of stochastic failure increases exponentially as feature size decreases. Furthermore, for the same feature size, increasing the distance between features may significantly increases the failure probability. Line cuts which are relatively widely spaced are a significant source of failure.

Many types of defect failures may occur for the same population of patterns. For example, in addition to bridging of trenches, the lines separating the trenches may be broken, which may be attributed to stochastic resist loss, or secondary electron effects. Coexistence of stochastically underexposed and overexposed defect regions leads to a loss of dose window at a certain post-etch defect level between the low-dose and high-dose patterning regions. Hence, the resolution benefit from the shorter wavelength may be lost.

In accordance with one embodiment of the present disclosure, various simulation models, assessments, and objective functions are used to account for stochastic defectivity counts. In accordance with one embodiment, simulation models generate defect predictions calibrated to a process flow. Defect-aware models are used in performing assessments and generating report about defectivity rate that can be used in a process window, or in any other suitable measure of the manufacturability, to optimize the source illumination as well as the mask so as to improve wafer yield. The defect prediction used for source mask optimization, in accordance with one embodiment, uses, in part, stochastic variables as input parameters to a model generator module, an assessment module, and a cost function optimizer module.

FIG. 1 shows a source mask optimization flow 100 adapted to account for defectivity, in accordance with one embodiment of the present disclosure. Source generator 10 is adapted to generate a source candidate (a predefined illumination pattern), which may be parametric or pixilated. A parametric source type includes shapes which can be described by a subset of parameters. A pixilated source type includes source points which are defined by positions along the x-y coordinates as well as the light intensity for the positions. Through inclusion of defect-aware processes in the source mask optimization, embodiments of the present disclosure provide many advantages. Among such advantages are reduced sensitivity to process variations, enhanced wafer yield, and reduced production costs.

Model generator 12 is adapted to generate a process simulation model in response to the source candidate supplied by source generator 10 as well as to the measurements of critical dimensions/patterns made on a wafer, the defect rates, and the photoresist effects. The model generated by model generator 12 may be a rigorous model that includes a rigorous 3-dimensional mask image data as well the photoresist effects for the EUV.

Mask optimization module 14 receives, among other things, (i) the defect rates, (ii) measurements of critical dimensions/patterns made on the wafer, and (iii) data related to the placement of assist feature (AF) and masks. In response, mask optimization module 14 performs optical proximity corrections (OPC) to generate OPC mask data. As part of the OPC correction, mask optimization module 14 may include assist features and/or printing features on the mask.

Figure 2:
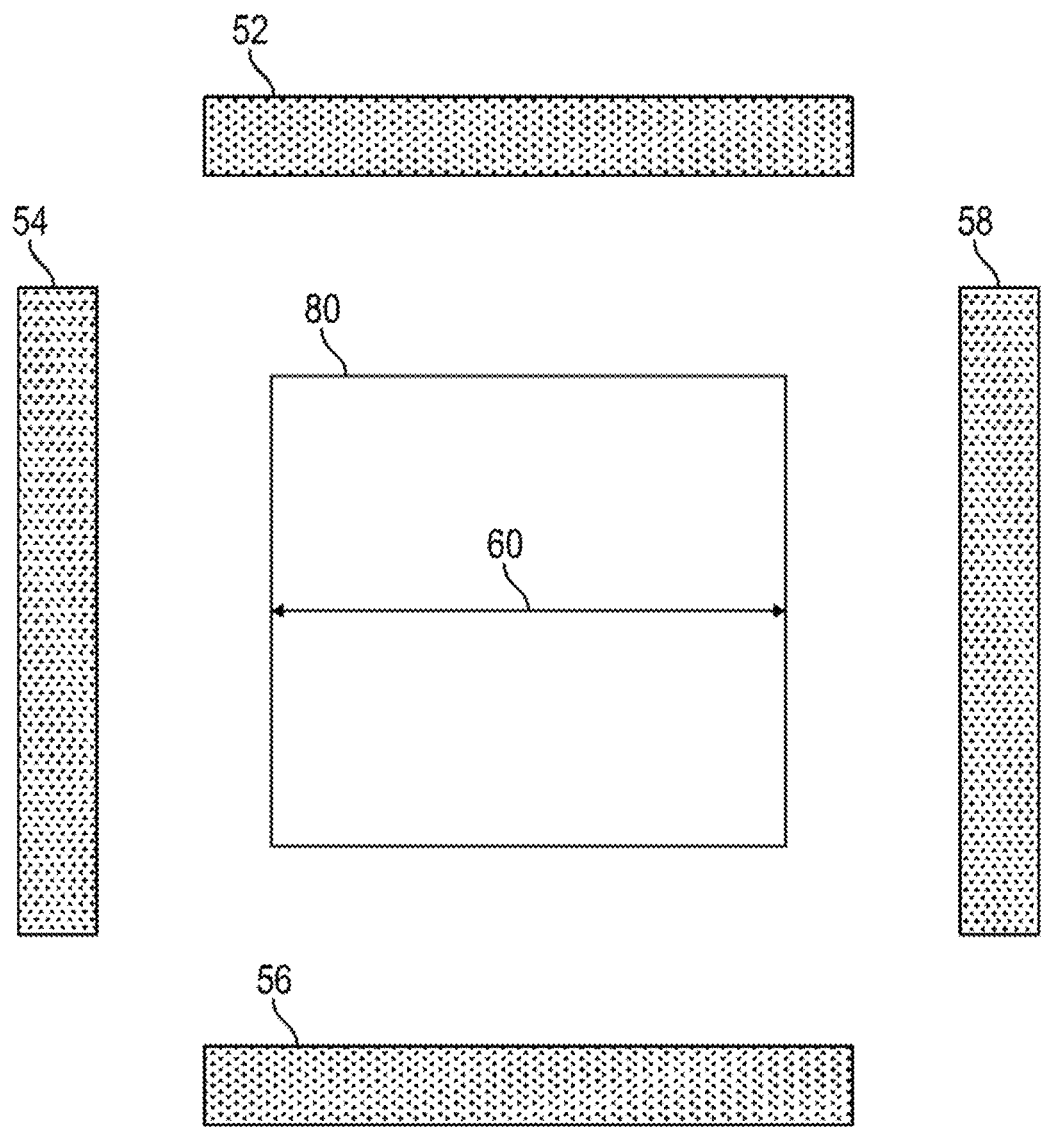
FIG. 2 shows a contact with assist features and a gauge.

FIG. 2 shows an exemplary mask contact 80, assist features 52, 54, 56, 58 disposed along outer edges of contact 80, as well as gauge 60. Contact 80 is transferred to a wafer following photoresist exposure and bake steps. Assist features 52, 54, 56, 58 are not transferred to the wafer but improve the process of transferring the contact pattern to the wafer. Coordinates of gauge 60 are used in assessing the location and direction of the contact on the wafer.

Assessment module 16 is adapted to receive the OPC mask data and compute parameters for such lithographic evaluation metrics, such as normalized image log slope (NILS), mask enhancement error factor (MEEF), depth of focus (DOF), edge placement error (EPE), Process Window (PW), and the like. As is known, NILS provides a measure of the optical image quality; MEEF provides a measure of the change in the wafer CD as a function of the change in the mask CD; DOF provides a measure of process window from the degree of defocus in nanometers; and EPE provides a measure of the difference between a target mask edge and a corresponding wafer edge in nanometers. The parameters computed by assessment module 16 are determined from measured gauges. In one embodiment, a user-supplied file determines the name, location, start and end positions of each gauge selected for each site of interest. Because assessment module 16 uses, among other parameters, defect rates, the parameters computed by assessment module 16 enhance the optimization of the optical source and mask quality compared to conventional OPC techniques.

Figure 3A:
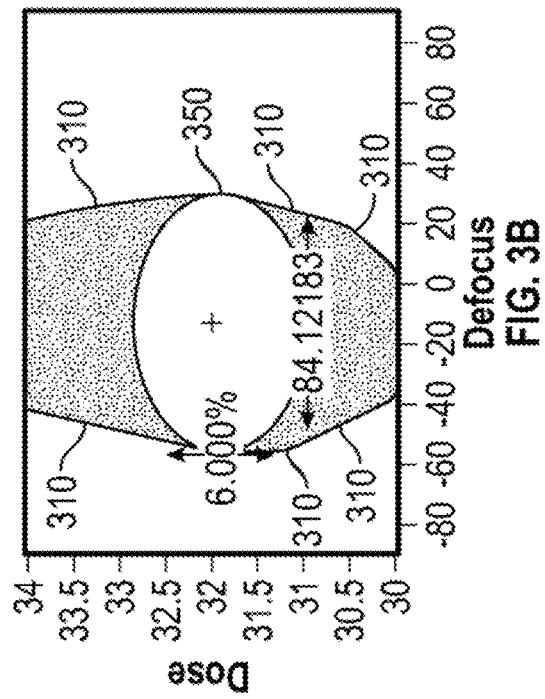
FIG. 3A shows a polygon defining an area within which exemplary measured contact CDs fall within a predefined window for a number of optical doses and defocus ranges.
Figure 3B:
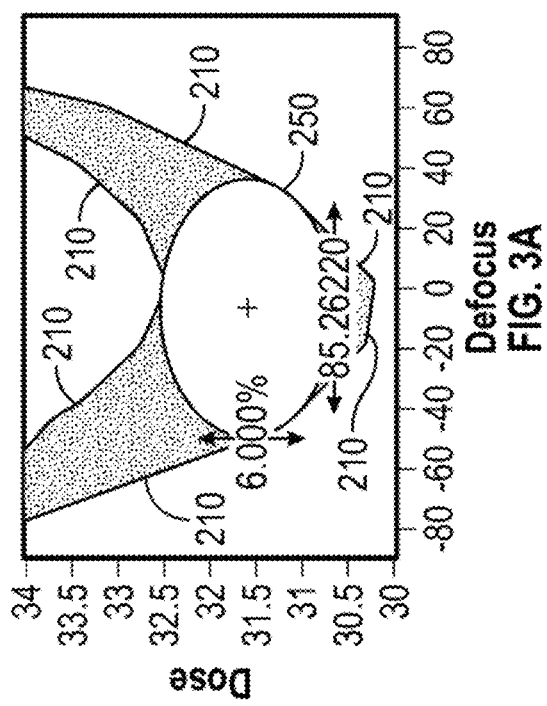
FIG. 3B shows a polygon defining a region within which the defect rate is less than a predefined value for a number of optical doses and defocus ranges.
Figure 3C:
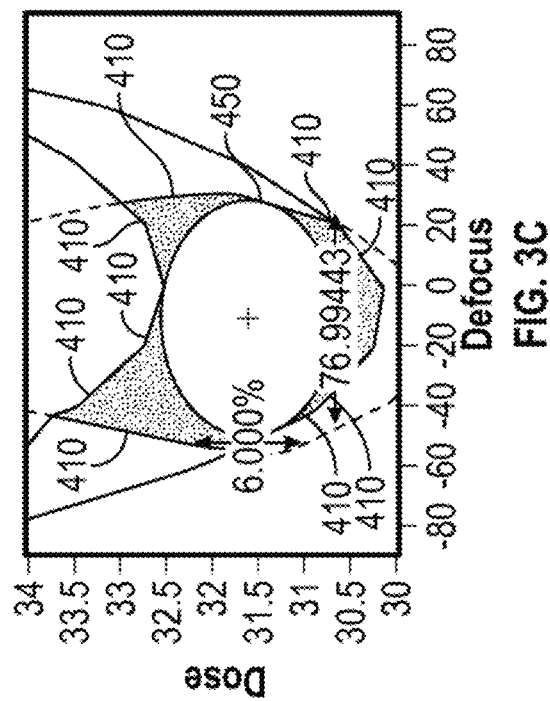
FIG. 3C shows a region defined by superimposing the polygons shown in FIGS. 3A and 3B, in accordance with one embodiment of the present disclosure

Cost function optimizer 18 is adapted to determine whether a cost function determined using the parameters computed by assessment module 16 satisfy a user-defined assessment criteria. If the cost function fails to meet the assessment criteria, then a new source candidate is selected by source generator, and further OPC may be performed by mask optimization module 14. The iterative process of selecting a new source candidate and/or OPC continues until the cost function satisfies the user-defined assessment or a predetermined maximum number for iterations is reached. When the user-defined assessment is met by the cost function, an optimized source candidate 20, mask 22, as well processing recipe 24 for transferring the mask patterns to a wafer are provided. The recipe provides the mask optimization using the models and the mask, FIGS. 3A-3C show a defect-aware assessment (DA) process window, in accordance with one embodiments of the present disclosure. The DA model may use, for example, the ratio of the number of failed contacts to a number of total contacts within a given area to predict the number of defects. The assessments generated by the DA model include a defect aware process window (DAPW) which are determined based upon gauge locations. In some embodiments, a user provides specific measurement locations by inclusion of a file which contains unique names for each site of interest and a start and end position for the location.

The DAPW computes the maximum elliptical or rectangular process window in terms of exposure and depth of focus. In one embodiment, the assessment values used to compute the process window are the CDs measured in nanometers, defect ratios for a number of doses (measured in millijoule/cm$^2$), and focus ranges measured in nanometers. In some embodiments, as described below, the computation of the process window is determined by an overlay of the CD-based process window and the defect-based process window. The overlap of the windows generates a common process window defining a manufacturable process window.

FIG. 3A shows a polygon bounded by lines 210 defining a region within which measured contact CDs fall within a predefined window (e.g., less than 10% variance from the nominal CD in this example) for various optical doses and defocus values. Ellipse 250 is the largest ellipse that fits within the boundaries of the polygon. As is seen from FIG. 3A, a maximum depth of focus of 85.26 nm is achieved for a dose exposure latitude of 6% as measure from the center of ellipse 250. In other words, the process window as defined by ellipse 250, provides for a dose exposure latitude of 6% at a maximum depth of focus of 85.26 nm.

FIG. 3B shows a polygon bounded by lines 310 and defining a region within which the defect rate is less than a predefined value (e.g., less than 1e-6) for a number of optical doses and defocus values, as determined by assessment module 16. In one embodiment, the defect rate may be measured by counting the number of defects per cm$^2$. Ellipse 350 is the largest ellipse that fits within the boundaries of the polygon. As is seen from FIG. 3B, a maximum depth of focus of 84.12 nm is achieved for a dose exposure latitude of nearly 6% as measure from the center of ellipse 350.

FIG. 3C shows the superposition of the polygons of FIGS. 3A and 3B. The dashed lines in FIG. 3C define the same boundary as that defined by lines 310 of FIG. 3B. The solid lines in FIG. 3C define the same boundary as that defined by lines 210 of FIG. 3A. The shaded polygon bounded by lines 410 in FIG. 3C is defined by the overlapping areas of the two polygons shown in FIGS. 3A and 3B, as determined by the assessment module and supplied to the cost function optimizer. Ellipse 450 is the largest ellipse that can fit within the shaded polygon of FIG. 3C. As seen from FIG. 3C, by taking the defectivity into account, in accordance with embodiments of the present disclosure, a different set of dose and defocus (i.e., depth of focus) values is achieved. For example, a maximum depth of focus of 76.99 nm is achieved for a dose exposure latitude of nearly 6% as measured from the center of ellipse 450. A defect-aware optimization technique, in accordance with embodiments of the present disclosure, by taking defectivity (defect rate) into account, improves the overlap of the CD and the defectivity process windows, and predicts a different sets of dose and defocus values in optimizing the source and mask.

Table I below shows exemplary target values of metrics NILS, EPE and depth of focus (DOF) as well as median values of these parameters determined as described during a defect-aware optimization technique, in accordance with one embodiments of the present disclosure.

TABLE I

| Metris | Target | Median |
|---|---|---|
| NILS | 2.4 | 2.50 |
| EPE | 0.5 | 0.02 |
| DOF at 6% Exposure latitude | 70 nm | 77 nm |

The target values shown in Table I were provided to the defect-aware source mask optimization system shown in FIG. 1. Shown under the Median column are the values of the corresponding metrics as provided by the optimization process in accordance with embodiments of the present disclosure. As is seen from this table, embodiments of the present disclosure advantageously provide a higher NILS value than the target value. The EPE value as determined by this exemplary embodiment of the present disclosure is advantageously lower than the target value. The DOF value as determined by this exemplary embodiment of the present disclosure is also advantageously higher than the target value.

Figure 4A:
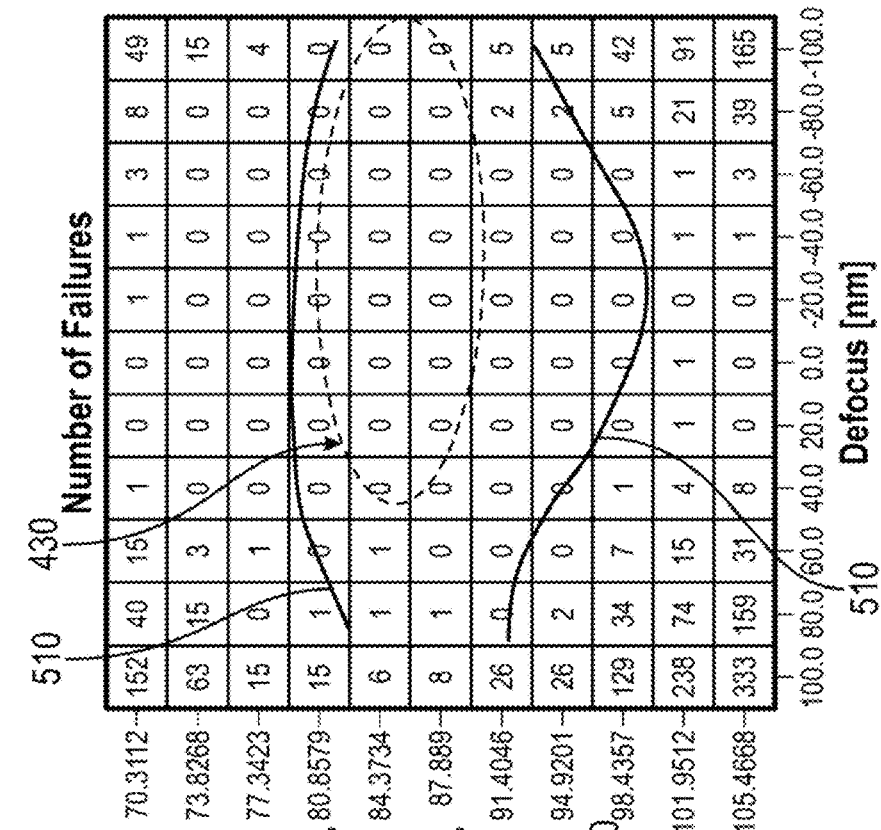
FIG. 4A shows exemplary number of failures for a mask optimized using a conventional SMO for various dose and defocus ranges.

FIG. 4A shows exemplary number of failures for a mask optimized using a conventional SMO for various dose and DOF values. A conventional SMO does not take in to account the defectivity during optimization. Lines 410 in FIG. 4A define the boundary of the region within which measured contact CDs fall within a predefined window. Ellipse 420 is the largest ellipse that fits within the boundary lines 410 and within which the number of failures for all dose and DOF values are zero. As is seen, the CD and the defectivity windows have a relatively small overlap (blocks containing "0" represent no defects). Ellipse 420 represents the common process window between the CD and the defect-aware process windows which is 120 nm at 6% exposure latitude.

Figure 4B:
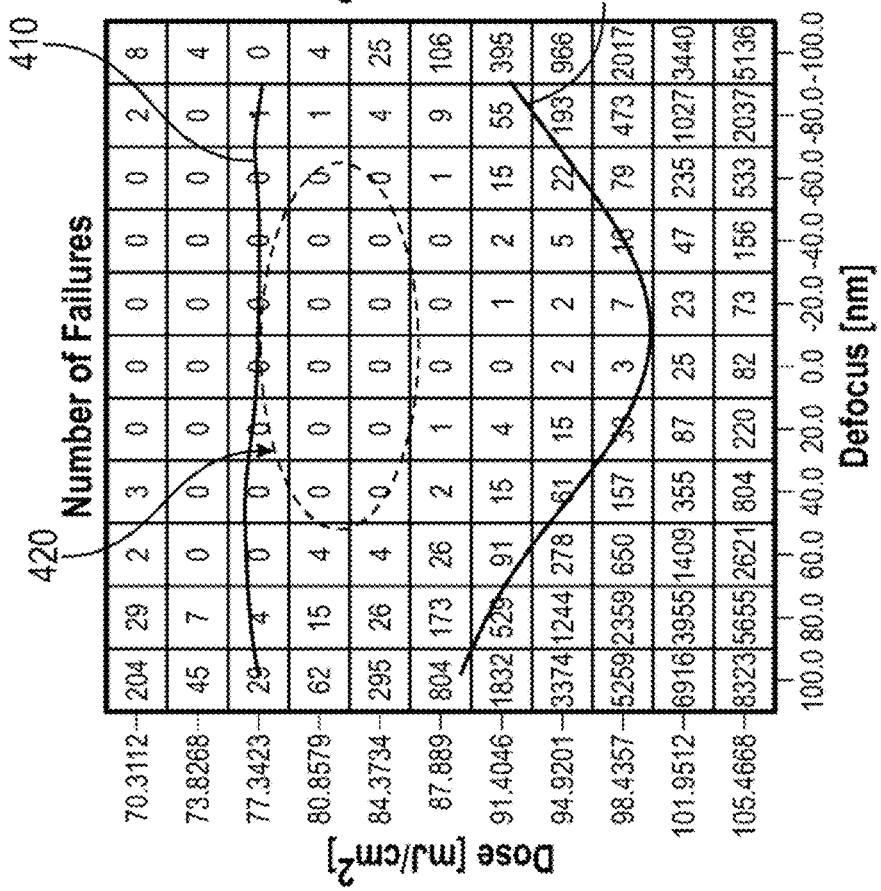
FIG. 4B shows exemplary number of failures for a mask optimized using a defect-aware SMO for various dose and defocus ranges, in accordance with one embodiment of the present disclosure.

FIG. 4B shows exemplary number of failures for a mask optimized using a defect-aware SMO at various dose and DOF values, in accordance with one embodiment of the present disclosure. Lines 510 in FIG. 4B define the boundary of the region within which measured contact CDs fall within a predefined window. Ellipse 430, which is the largest ellipse that fits within the boundary lines 510 and within which the number of failures for all dose and DOF values are zero, is advantageously larger than ellipse 420. FIG. 4B therefore has a significantly enhanced overlap of the CD and the defectivity window relative to that of FIG. 4A. Therefore, in accordance with embodiments of the present disclosure, the manufacturable process window is increased—due to the enhanced overlap as shown by ellipse 430—resulting in a 160 nm process window at 6% exposure latitude.

Referring to FIG. 1, cost function (CF) optimizer 18 is adapted to receive the parameters computed by assessment module 16 and calculate a cost using a threshold-based target, as shown in equation (1) shown below:

$$CF = \Sigma_{x,y}^o \Sigma_{E,D,M}^m \Sigma_{A=1}^n W_n(O_{E_n} + DA_{E_n})$$

Equation 1

In equation (1), parameter x represents the distance from the center of a site of interest to the mask end along the x-axis, parameter y represents the distance from the center of the site of interest to the mask end along the y-axis, parameter E represents the exposure dose, parameter D represent the defocus value, parameter M represents the mask bias indicative of the manufacturing non-uniformity of the mask, and parameter A represents the assessment type ranging from 1 to n. parameter $W_n$ represents the weight assigned to the location of interest, parameter $O_{E_n}$, computed by assessment module 16, represents the optical assessment error (as obtained for example, by NILS, EPE, MEEF, and the like) for the site of interest. Parameter $DA_{E_n}$ represents the defect-aware assessment.

In some embodiments, the cost function value is a weighted sum of each assessment type for each user-specified location on the sample. In some embodiments, the cost function value is determined as the assessment value, i.e., the target value. If the assessment value is less than the target value, the cost function value is zero for the specific assessment. Parameter $DA_{E_n}$ may be used at a specific dose and focus, or at many dose and focus values, i.e., process window. To calculate the cost associated with the DAPW, a target value in nanometers is first determined. Any DAPW value which does not exceed the target value is added to the total cost value using the following equation (2):

$$DA_{E_n} = \text{Max}(0, DAPW - DAPW \text{ target})$$

Equation 2

For example, if the DAPW target value is 6 nm and the computed DAPW value is 6.25 nm, the $DA_{E_n}$ value will be 0.25. If the DAPW target value is 6 nm and the computed DAPW value is 5.5 nm, the $DA_{E_n}$ value will be 0.

Referring to equation (1) if the CF is computed to be greater than a threshold value of 0, then a different source candidate is used to generate the mask data. If the CF is computed to be equal to the threshold of 0, the optimization has reached the CF target and the optimization is considered complete.

Figure 5:
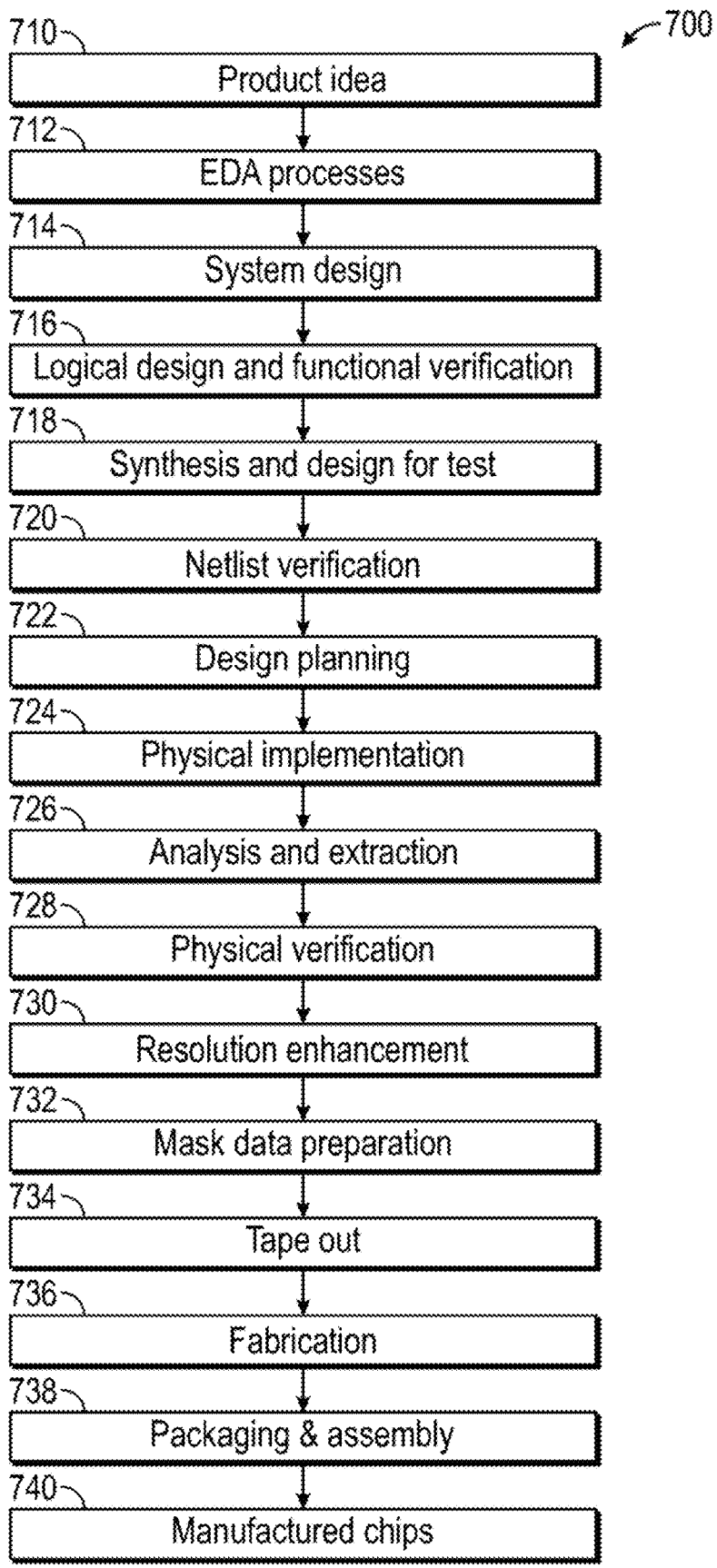
FIG. 5 shows a flowchart of various processes used during the design and manufacture of an integrated circuit, in accordance with some embodiments of the present disclosure.

FIG. 5 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level representation of a design adds more useful detail into the design description, for example, more details for the modules that include the description. The lower levels representation of a design may be generated by a computer, derived from a design library, or created by another design automation process. An example of a specification language representative of a lower level description of a design is SPICE, which is used for detailed descriptions of circuits with many analog components. Descriptions at each level of representation are enabled for use by the corresponding tools of that layer (e.g., a formal verification tool). A design process may use a sequence depicted in FIG. 5. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 6) may be used to store the programs and data structures that are used by some or all of the EDA products described herein, and products used for development of cells for the library and for physical and logical design that use the library.

Figure 6:
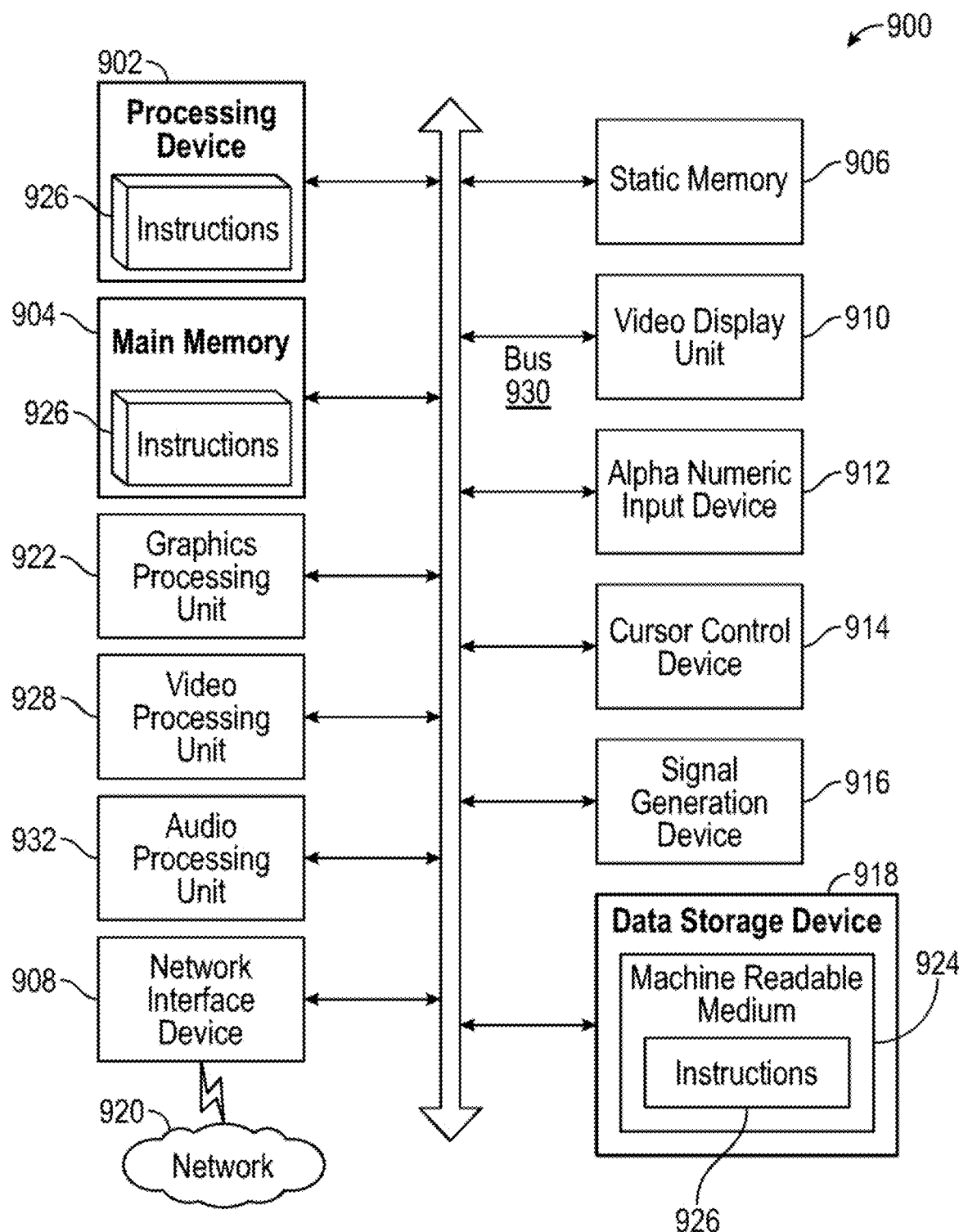
FIG. 6 shows a diagram of an example of a computer system in which embodiments of the present disclosure may operate.

FIG. 6 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of generating a mask used in fabrication of a semiconductor device, the method comprising:
   selecting a first source candidate that corresponds to a first illumination pattern;
   generating a process simulation model in response to an overlay of defect rate and critical dimension (CD) process windows, and the selected source candidate;
   performing a first optical proximity correction (OPC) on data associated with the mask to generate OPC mask data, the performing of the OPC being responsive to the process simulation model;
   assessing one or more lithographic evaluation metrics based on the OPC mask data;
   computing a cost based on the assessed one or more lithographic evaluation metrics;
   determining, by a processor, whether the computed cost satisfies a threshold condition; and
   in response to determining that the computed cost does not satisfy the threshold condition, selecting a second source candidate that corresponds to a second illumination pattern different from the first illumination pattern.

2. The method of claim 1 further comprising:
   performing a second OPC on the data associated with the mask if the computed cost is greater than a threshold value.

3. The method of claim 2 further comprising:
   generating the process simulation model in response to measurements of critical dimensions on a wafer fabricated using the mask.

4. The method of claim 3 further comprising:
   generating the process simulation model in response to effects of a photoresist used to fabricate the wafer.

5. The method of claim 4 further comprising:
   performing the first optical proximity correction in response to a depth of focus of an optical source generating the first source candidate.

6. The method of claim 5 further comprising:
   forming assist features on the mask.

7. The method of claim 6 further comprising:
   determining parameters of the lithographic evaluation metrics from measurements made on gauges formed on the wafer.

8. The method of claim 1 wherein the lithographic evaluation metrics are selected from normalized image log slope, mask enhancement error factor, depth of focus, stochastic variance edge placement error, and stochastic variance process window metrics.

9. A non-transitory computer readable storage medium comprising instructions which when executed by a processor cause the processor to:
   select a first source candidate that corresponds to a first illumination pattern;
   generate a process simulation model in response to an overlay of defect rate and critical dimension (CD) process windows, and the first source candidate,
   perform a first optical proximity correction (OPC) on data associated with a mask to generate OPC mask data, wherein the processor is caused to perform the OPC in response to the process simulation model;
   assess one or more lithographic evaluation metrics based on the OPC mask data;
   compute a cost based on the assessed one or more lithographic evaluation metrics;
   determine whether the computed cost satisfies a threshold condition; and
   in response to determining that the computed cost does not satisfy the threshold condition, select a second source candidate that corresponds to a second illumination pattern different from the first illumination pattern.

10. The non-transitory computer readable storage medium of claim 9 wherein the instructions further cause the processor to:
    perform a second OPC on the data associated with the mask if the computed cost is greater than a threshold value.

11. The non-transitory computer readable storage medium of claim 10 wherein the instructions further cause the processor to:
    generate the process simulation model in response to measurements of critical dimensions on a wafer fabricated using the mask.

12. The non-transitory computer readable storage medium of claim 11 wherein the instructions further cause the processor to:
    generate the process simulation model in response to effects of a photoresist used to fabricate the wafer.

13. The non-transitory computer readable storage medium of claim 12 wherein the instructions further cause the processor to:
perform the first optical proximity correction in response to a depth of focus of an optical source generating the first source candidate.

14. The non-transitory computer readable storage medium of claim 13 wherein the instructions further cause the processor to:
form assist features on the mask.

15. A system comprising:
a memory storing instructions; and
a processor, coupled with the memory and to execute the instructions, the instructions when executed causing the processor to:
select a first source candidate that corresponds to a first illumination pattern;
generate a process simulation model in response to an overlay of defect rate and critical dimension (CD) process windows, and the first source candidate;
perform a first optical proximity correction (OPC) on data associated with a mask to generate OPC mask data, wherein the processor is caused to perform the OPC in response to the process simulation model;
assess one or more lithographic evaluation metrics based on the OPC mask data;
compute a cost based on the assessed one or more lithographic evaluation metrics;
determine whether the computed cost satisfies a threshold condition; and
in response to determining that the computed cost does not satisfy the threshold condition, select a second source candidate that corresponds to a second illumination pattern different from the first illumination pattern.

16. The system of claim 15 wherein the instructions further cause the processor to:
perform a second OPC on the data associated with the mask if the computed cost is greater than a threshold value.

17. The system of claim 16 wherein the instructions further cause the processor to:
generate the process simulation model in response to measurements of critical dimensions on a wafer fabricated using the mask.

18. The system of claim 17 wherein the instructions further cause the processor to:
generate the process simulation model in response to effects of a photoresist used to fabricate the wafer.

19. The system of claim 18 wherein the instructions further cause the processor to:
perform the first optical proximity correction in response to a depth of focus of an optical source generating the first source candidate.

20. The system of claim 19 wherein the instructions further cause the processor to:
form assist features on the mask.

* * * * *